June 30, 1964 J. R. LOUIS 3,139,524
MULTIPLIER USING VARIABLE IMPEDANCE IN SECONDARY OF TRANSFORMER
Filed July 25, 1960
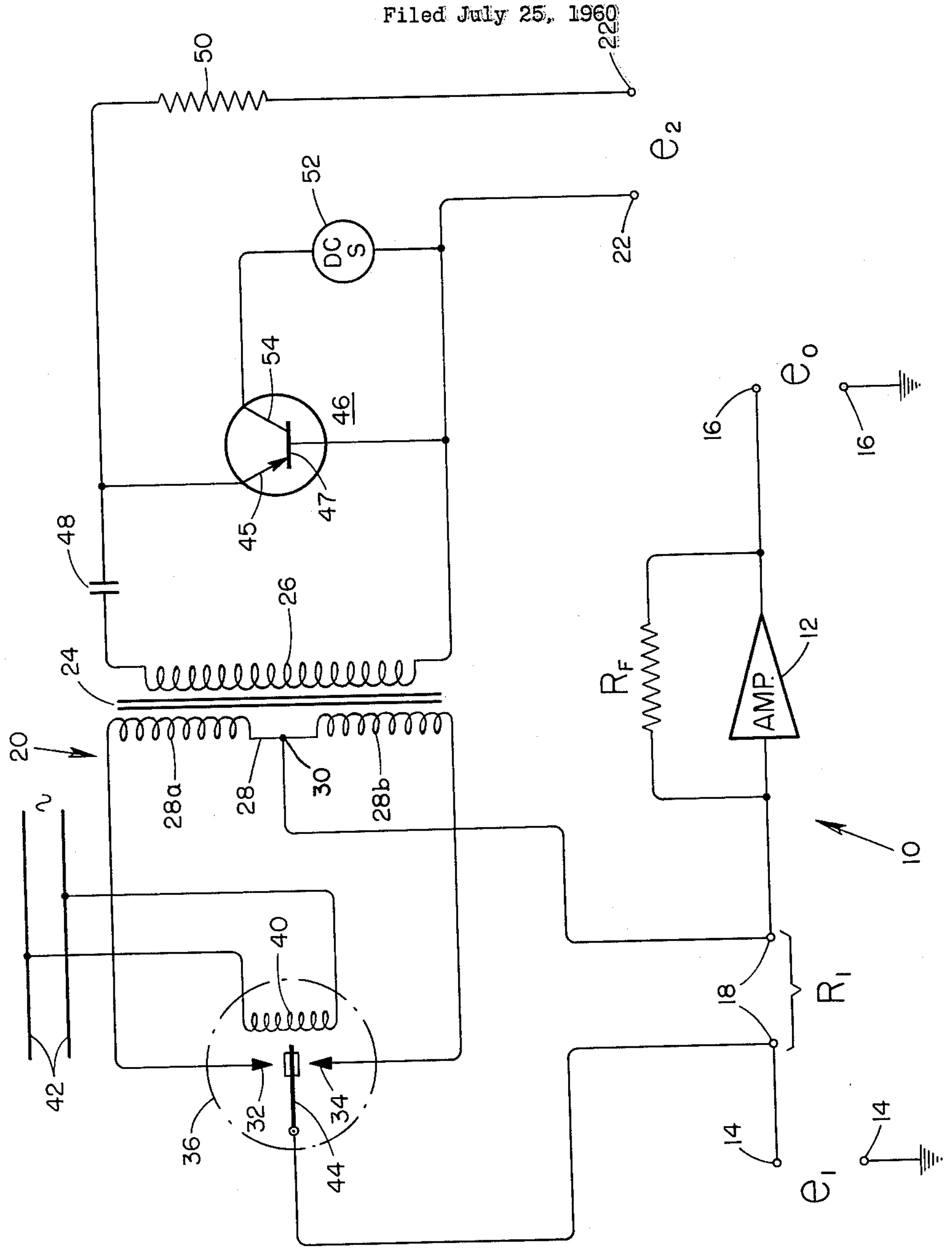
INVENTOR.
JOHN R. LOUIS
BY John F. Luhrs
ATTORNEY United States Patent Office 3,139,524
Patented June 30, 1964

3,139,524
MULTIPLIER USING VARIABLE IMPEDANCE IN SECONDARY OF TRANSFORMER

John R. Louis, Cleveland, Ohio, assignor to Bailey Meter Company, a corporation of Delaware
Filed July 25, 1960, Ser. No. 44,945
10 Claims. (Cl. 235—194)

This invention relates to computing circuits and more particularly to an improved circuit for achieving analog multiplication or division of a plurality of variables.

In fields such as industrial process control, instrumentation systems are often required which are capable of performing mathematical computations in regard to two or more variables. For example, in a system utilizing a gas flow meter to achieve optimum accuracy it is necessary to effect an automatic correction of the gas flow signal for variations in the density of the gas. Such a correction necessarily involves the multiplication of two variables in accordance with a mathematical equation to achieve the desired result.

In the field of electronic instrumentation an operational amplifier is often employed to perform mathematical computations in regard to two or more signals. In general, such an amplifier comprises a high gain D.-C. amplifier and passive input and feedback impedances, if the circuit gain is high and the amplifier input impedance is considerably greater than the passive impedances it can be shown that the output to input voltage ratio is directly proportional to the passive feedback to input impedance ratio. Thus, by proper choice of the passive input and feedback impedances it is possible to obtain integration, differentiation, multiplication, division or combinations of these computations.

While the above described operational amplifier circuit is capable of performing multiplication or division the computation is limited in presently available circuits to multiplication or division of a variable by a constant. For example, the following equation may be written for the output voltage $e_0$ of an operational amplifier circuit in terms of the input voltage $e_1$ and passive input and feedback impedances $Z_1$ and $Z_f$.

$$e_0 = \frac{Z_f}{Z_1} e_1$$

It will be apparent from the above equation that if impedance $Z_1$ or $Z_f$ is proportional to a desired constant and the input signal $e_1$ is representative of the magnitude of a variable multiplication or division will occur.

Attempts have been made to achieve multiplication or division of two variable signals with the operational amplifier circuit described above by applying one signal to the input and providing a variable passive input impedance such as a transistor which will undergo variation in impedance in accordance with the other signal. Thus far such circuits have been found impractical for the reason that variation in either signal affects the impedance of the transistor and renders the computation inaccurate. Thus, the computations have generally been limited to multiplication or division of a variable by a constant.

It is a principal object of my invention to achieve accurate multiplication or division of two variables in an operational amplifier circuit.

Another object of the invention is to provide an operational amplifier circuit with a variable passive input impedance which is unaffected by variation in the input signal to the circuit.

Still another object of the invention is to convert an A.-C. circuit resistance into a D.-C. circuit resistance.

A further object of the invention is to provide an improved analog computing circuit for achieving the multiplication or division of two or more variables.

Other objects and advantages will become apparent from the following description taken in connection with the accompanying drawing which is a schematic illustration of a computing circuit embodying the invention.

Referring to the drawing, there is shown an operational amplifier circuit 10 including a high gain-low output impedance D.-C. amplifier 12 which may be of the type disclosed in copending application Serial No. 770,710 filed on October 30, 1958, by Harold H. Koppel et al., now Patent No. 3,080,531. The operational amplifier circuit is provided with input terminals 14 and output terminals 16, a proportional variable amplitude output signal $e_0$ appearing at output terminals 16 proportional to variable amplitude input signal $e_1$ multiplied by the gain G of the circuit. The D.-C. amplifier 12 is provided with an external feedback circuit comprising a feedback resistance $R_f$ connected between the amplifier input and output. As indicated diagrammatically a passive input resistance $R_1$ is established between terminals 18 by a circuit 20 having input terminals 22 to which a second variable input signal $e_2$ is applied. The gain G of the operational amplifier 10 is established by the ratio of the feedback resistance $R_f$ to the input resistance $R_1$. Thus, the following equations can be written for the output voltage $e_0$ in terms of the input voltage $e_1$ the derivation of which will be obvious to those skilled in the art:

$$e_0 = -\frac{R_f}{R_1} e_1 \quad (1)$$

$$e_0 = -G_{e_1} \quad (2)$$

As discussed in the introductory remarks, attempts have been made to achieve multiplication of two variables with the basic operational amplifier circuit thus far described by applying one variable input signal to the amplifier input and causing the passive input resistance and gain of the circuit to vary in accordance with the other signal. As previously mentioned such multiplications have heretofore been unsuccessful due to the effect of both variable signals on the passive input impedance. In general through provision of the circuit 20 I provide a variable passive input resistance $R_1$ the magnitude of which is unaffected by variations in the input signal $e_1$. In effect, the circuit 20 utilizes the variable direct voltage signal $e_2$ to establish a variable A.-C. resistance which is transformed into a D.-C. resistance appearing as passive resistance $R_1$.

The circuit 20 comprises a transformer 24 having a secondary winding 26 and a primary winding 28 provided with a center tap 30 separating the winding 28 into halves **28*a* and 28*b*. The ends of the primary winding 28 are connected to the fixed contacts 32 and 34 of an electric vibrator or "chopper" 36. The chopper 36 comprises an operating coil 40 coupled to a suitable source of alternating line voltage 42 and a movable contact arm 44 which cycles between the contacts 32 and 34 at the frequency of the source 42. To complete the circuitry of the chopper 36 and primary 28, the movable contact arm 44 and center tap 30 are connected across the terminals 18**.

In operation of the chopper 36, if the input $e_1$ is of uniform amplitude during one half cycle of the source 42 the contact arm 44 will engage contact 32 causing a current flow from input terminals 14 through primary winding half **28*a* to the amplifier 12. During the other half cycle the contact arm 44 will engage contact 34 causing current flow through the primary winding half 28*b* to the amplifier 12. Thus, a steady D.-C. current flow will be established to the amplifier 12 while an alternating square wave signal will appear across the primary winding 28 and secondary winding 26. While the chopper 36 has been shown as comprising a mechanical type it will be apparent to those skilled in the art that many other devices of the electronic type may be utilized to produce an alternating signal across the primary winding 28**.

The secondary winding 26 is connected across the emitter 45 and base electrode 47 of a transistor 46 in series with a capacitor 48. A resistance 50 is connected between one input terminal 22 and the emitter electrode 45 while a D.-C. bias source 52 is connected between the collector electrode 54 and the other terminal 22. The purpose of the transistor 46 and circuit therefore is to establish a variable A.-C. resistance or impedance in response to a variable input signal $e_2$ applied to terminal 22. As will be apparent to those skilled in the art variable impedance devices other than transistors may be utilized to establish this variable impedance within the scope of the invention.

In operation, the transistor 46 is biased to a condition of steady state conduction by direct voltage source 52. A variation in the direct voltage input signal $e_2$ is effective to vary the level of a D.-C. bias to vary the current flow through the transistor 46 and the A.-C. circuit resistance thereof to the alternating signal induced in the secondary winding 26 of transformer 24. This in effect varies the circuit resistance of primary winding 28 in the manner described below.

It is well-known in the art that the resistance of a secondary winding of a transformer is related to the resistance of the primary winding by the square of the turns ratio. Thus, in the present case the following equation may be written where $R_{28}$ is the resistance reflected from the secondary winding 26, $R_{26}$ is the circuit resistance seen by the secondary winding 26 and $n$ is the turns ratio of the primary winding 28 to the secondary winding 26:

$$R_{28}=n^2R_{26} \qquad (3)$$

The resistance $R_{28}$ is the A.-C. circuit resistance of the primary winding 28 to the alternating signal established across primary winding 28 by the chopper 36. Thus, the transformer 24 and chopper 36 cooperate to convert the A.-C. circuit resistance of transistor 46 into a D.-C. circuit resistance across terminals 18 in the input of the operational amplifier 10. At any instant only one half of the primary winding 28 is connected across terminals 18 by the chopper 36. Thus, considering the square of the transformation ratio at any instant the passive input resistance $R_1$ is equal to one fourth of the resistance $R_{28}$ as illustrated by the following equation:

$$R_1=\frac{R_{28}}{4} \qquad (4)$$

The circuit operates in the above described manner to produce a passive resistance or impedance $R_1$ having a magnitude proportional to a variable input signal $e_2$ which is unaffected by variations in the variable input signal $e_1$. If the circuit resistance of the transistor 46 is small relative to the circuit resistance of resistor 50 the alternating square wave signal generated by chopper 36 and induced into the secondary winding 26 will have a negligible effect on the resistance of the transistor 46. Moreover, the direct voltages in the primary and secondary circuits are isolated by transformer 24 thus rendering the A.-C. resistance of winding 26 unaffected by the direct voltage signals.

Variations in the magnitude of the passive input impedance $R_1$ in accordance with the magnitude of the input voltage $e_2$ will vary the gain G of the operational amplifier circuit 10 as discussed in connection with Equations 2 and 3. Thus, as will be apparent from Equations 1 and 2 a multiplication or division of the two variables representative by the variable signals $e_1$ and $e_2$ can be accomplished depending on the relationship of the signals $e_2$ and $e_1$ with the respective variables.

The circuit illustrated has been described as having direct voltage input $e_1$ of uniform amplitude. As described with an input voltage $e_1$ having this wave form, the chopper 36 will produce an alternating square wave signal across the primary of transformer 28. To increase the efficiency of transformer 28 an input signal $e_1$ may be utilized having a full wave rectified wave form and a frequency double that of the source 42. If the frequency of voltage $e_1$ is synchronized with the voltage of source 42 a sinusoidal voltage will be produced across primary 28.

While only one embodiment of the invention has been herein shown and described it will be apparent that many changes may be made in the construction and arrangement of parts without departing from the scope of the invention as defined in the appended claims.

It is claimed and desired to secure by Letters Patent of the United States:

1. In a computing circuit including an operational amplifier having an input proportional to the magnitude of a first variable, a passive feedback impedance, a passive input impedance proportional to the magnitude of a second variable, and an output proportional to a mathematical computation of the two variables, the improvement comprising, a transformer having a primary winding and a secondary winding, said primary winding having a center tap dividing the same into two winding halves having equal electrical impedances of magnitude depending on the impedance of said secondary winding, means cyclically and alternately connecting said primary winding halves in the input circuit of the operational amplifier to establish an alternating signal across said primary winding and said secondary winding to thereby establish the passive input impedance of magnitude equal to the impedance of each of said primary winding halves, and a variable impedance device having an impedance value proportional to the magnitude of the second variable coupled to said secondary winding to establish the electrical impedance of said primary winding halves to thereby establish a passive input impedance of magnitude proportional to the magnitude of the second variable.

2. Apparatus for varying the input impedance to a D.-C. operational amplifier having an external feedback impedance to produce a D.-C. output signal therefrom corresponding to a D.-C. input signal modified by a second D.-C. signal, comprising in combination, a transformer having a secondary winding and a primary winding, means cyclically connecting the D.-C. input signal to the amplifier through said primary winding, and means varying the current loading of the secondary winding in accordance with the magnitude of the second D.-C. signal to thereby vary the impedance of said primary winding.

3. Apparatus for varying the input impedance to a D.-C. operational amplifier having an external feedback impedance to produce a D.-C. output voltage signal therefrom corresponding to a D.-C. input voltage signal modified by a second D.-C. voltage signal, comprising in combination, a transformer having a secondary winding and two primary windings, means cyclically and alternately connecting the D.-C. input voltage signal to the input of the amplifier through one and then the other of said primary windings, and means varying the current loading of the secondary winding in accordance with the magnitude of the second D.-C. voltage signal to thereby cause corresponding variations in the impedance of said primary windings.

4. Apparatus in accordanc with claim 3 wherein said means cyclically and alternately connecting the D.-C. input voltage signal through one and then the other of said primary windings comprises a chopper having a vibrating contact connected to the D.-C. input voltage signal and two stationary contacts each connected to a separate one of said primary windings and means cyclically causing said vibrating contact to engage one and then the other of said contacts.

5. Apparatus in accordance with claim 3 wherein said last named means includes a variable conductance and means varying the conductance in accordance with the magnitude of the second D.-C. voltage signal.

6. Apparatus in accordance with claim 5 wherein said variable conductance is a transistor having an emitter and base connected across said secondary winding, a collector connected to said base through a D.-C. bias voltage and means varying the voltage across the emitter and base in accordance with the second D.-C. voltage signal.

7. Apparatus for establishing a voltage across a fixed impedance proportional to the product of two independent direct current signals, comprising, a fixed impedance, a transformer having a primary winding and a secondary winding, means cyclically connecting a first direct current signal to said fixed impedance through said primary winding, and means varying the current loading of the secondary winding in accordance with a second direct current signal to thereby vary the impedance of said primary winding.

8. Apparatus for establishing a voltage across a fixed impedance proportional to the product of two independent direct current signals, comprising, a fixed impedance, a transformer having a primary winding and a secondary winding, said primary winding having a center-tap dividing the same into two winding halves having equal electrical impedances, means cyclically and alternately connecting a first direct current signal to said fixed impedance through each of said primary winding halves, and means varying the current loading of the secondary winding in accordance with the magnitude of a second direct current signal to thereby cause corresponding variations in the impedance of said primary winding.

9. Apparauts for establishing a voltage across a fixed impedance proportional to the product of two independent direct current signals as set forth in claim 8 wherein said last named means includes a transistor having base, emitter and collector electrodes, said base and emitter electrodes respectively connected to opposite ends of said secondary winding.

10. Apparatus for establishing a voltage across a fixed impedance proportional to the product of two independent direct current signals as set forth in claim 9 wherein said cyclic means includes an electric switch operated between positions at a predetermined frequency.

References Cited in the file of this patent

UNITED STATES PATENTS

| | | |
|---|---|---|
| 2,471,262 | Cousins | May 24, 1949 |
| 2,638,578 | Piety | May 12, 1953 |
| 2,801,296 | Blecher | July 30, 1957 |
| 2,866,018 | Bell | Dec. 23, 1958 |
| 2,969,182 | Savet | Jan. 24, 1961 |
| 3,018,444 | Offner | Jan. 23, 1962 |